Aug. 1, 1961

D. W. PRICE 2,994,281

AMUSEMENT RIDE

Filed March 24, 1960

INVENTOR.
DUANE W. PRICE
BY
Threedy & Threedy-
HIS ATTORNEYS.

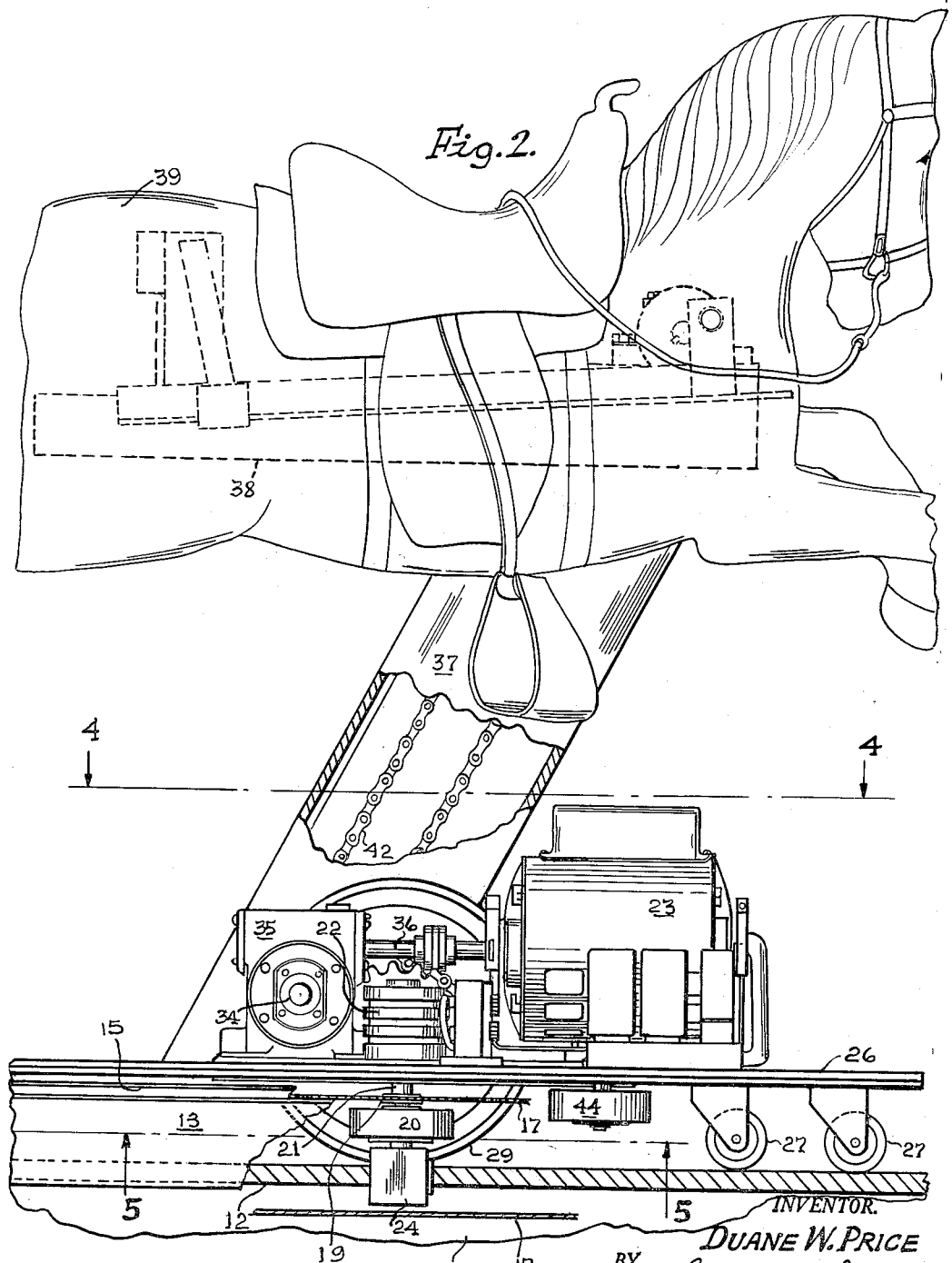

INVENTOR.
DUANE W. PRICE
BY
Threedy & Threedy
HIS ATTORNEYS.

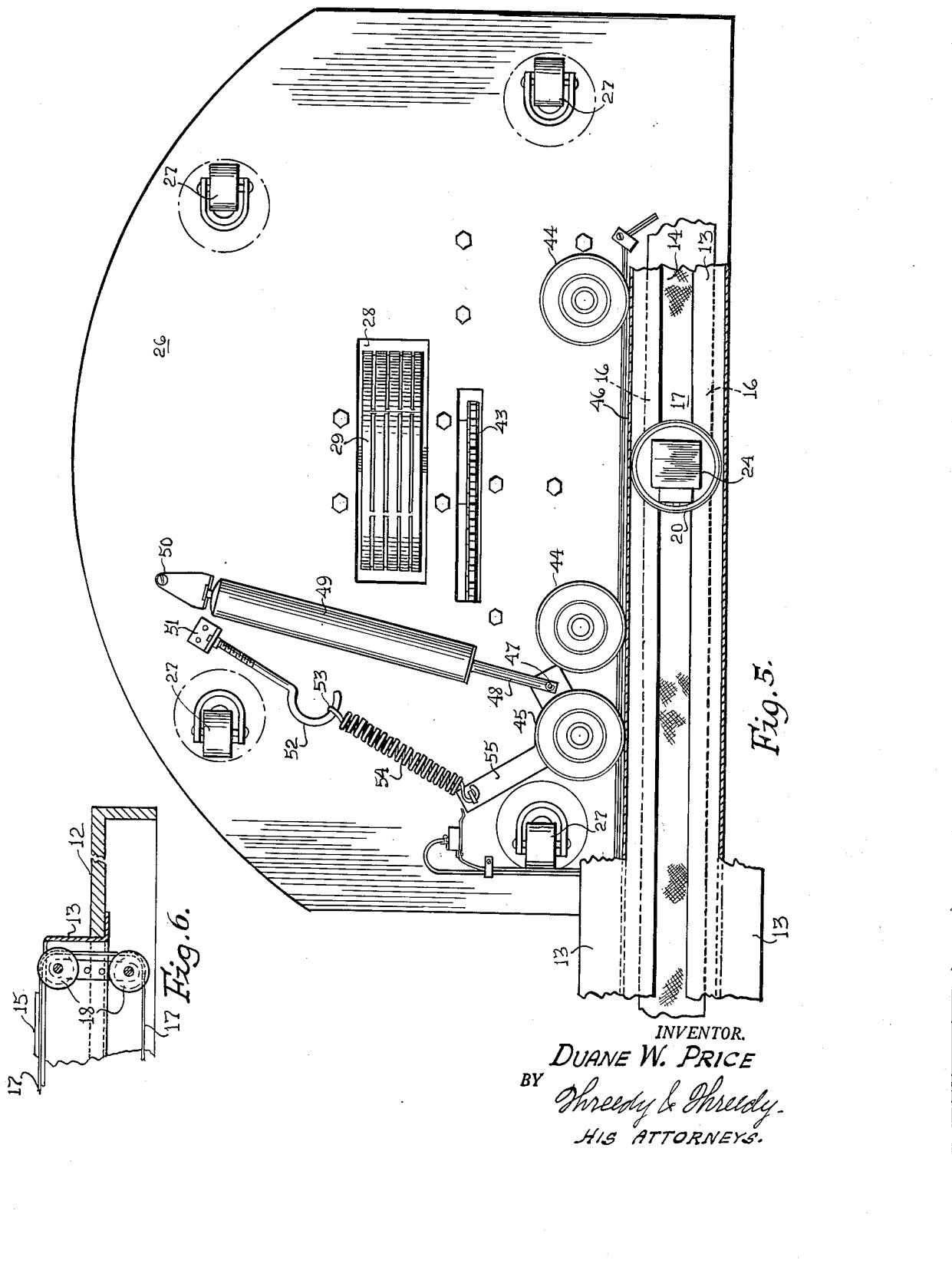

United States Patent Office 2,994,281
Patented Aug. 1, 1961

2,994,281
AMUSEMENT RIDE
Duane W. Price, 2601 Midvale, West Los Angeles, Calif.
Filed Mar. 24, 1960, Ser. No. 17,301
4 Claims. (Cl. 104—61)

My invention relates to an amusement ride especially, although not limited, for use by children of various ages. More particularly the invention is in a travelling hobby horse or the like and has as a principal object the provision of maneuvering a hobby horse, carriage or other body supporting member, over a predetermined area.

More specifically an object of the invention is to cause a hobby horse to travel along a straight path and when the end of such path is reached the hobby horse will be rotated to a position for travel in a return or opposite direction.

It is the ultimate aim of this invention to accomplish the foregoing objects by a structure comprising the minimum number of parts resulting in effective operation at a minimum cost of manufacture.

There have been prior to my invention hobby horses which while remaining in a fixed position are caused to rock to simulate to the rider, galloping of the horse. My invention has as one of its principal objects the additional provision for moving the horse over a circuitous path while the horse is rocking thus simulating not only the galloping of the horse but also its travel over a given path.

An ultimate result of the invention is the provision of a hobby horse which will give a maximum degree of amusement in that it not only rocks simulating galloping and trotting but also moves along a given path.

Other objects will appear hereinafter.

The invention consists in the novel combination and arrangement of parts to be hereinafter described and claimed.

The invention will be best understood by reference to the accompanying drawings showing the preferred form of construction, and in which:

FIG. 2 is a fragmentary side elevational view of the same showing parts thereof in section and taken substantially on line 2—2 of FIG. 3;

FIG. 5 is a fragmentary sectional detail view taken substantially on line 5—5 of FIG. 2;

FIG. 6 is a fragmentary sectional detail view taken substantially on line 6—6 of FIG. 1.

Figure 1:
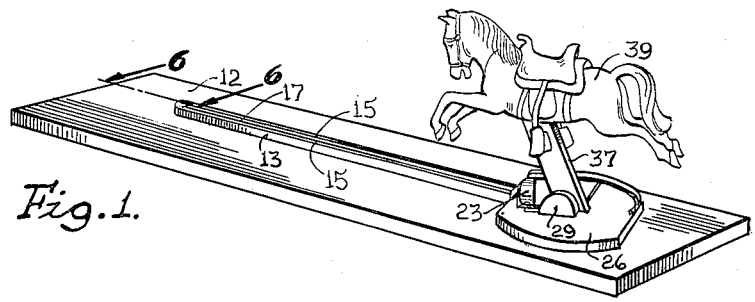
FIG. 1 is a perspective view of the invention.
Figure 3:
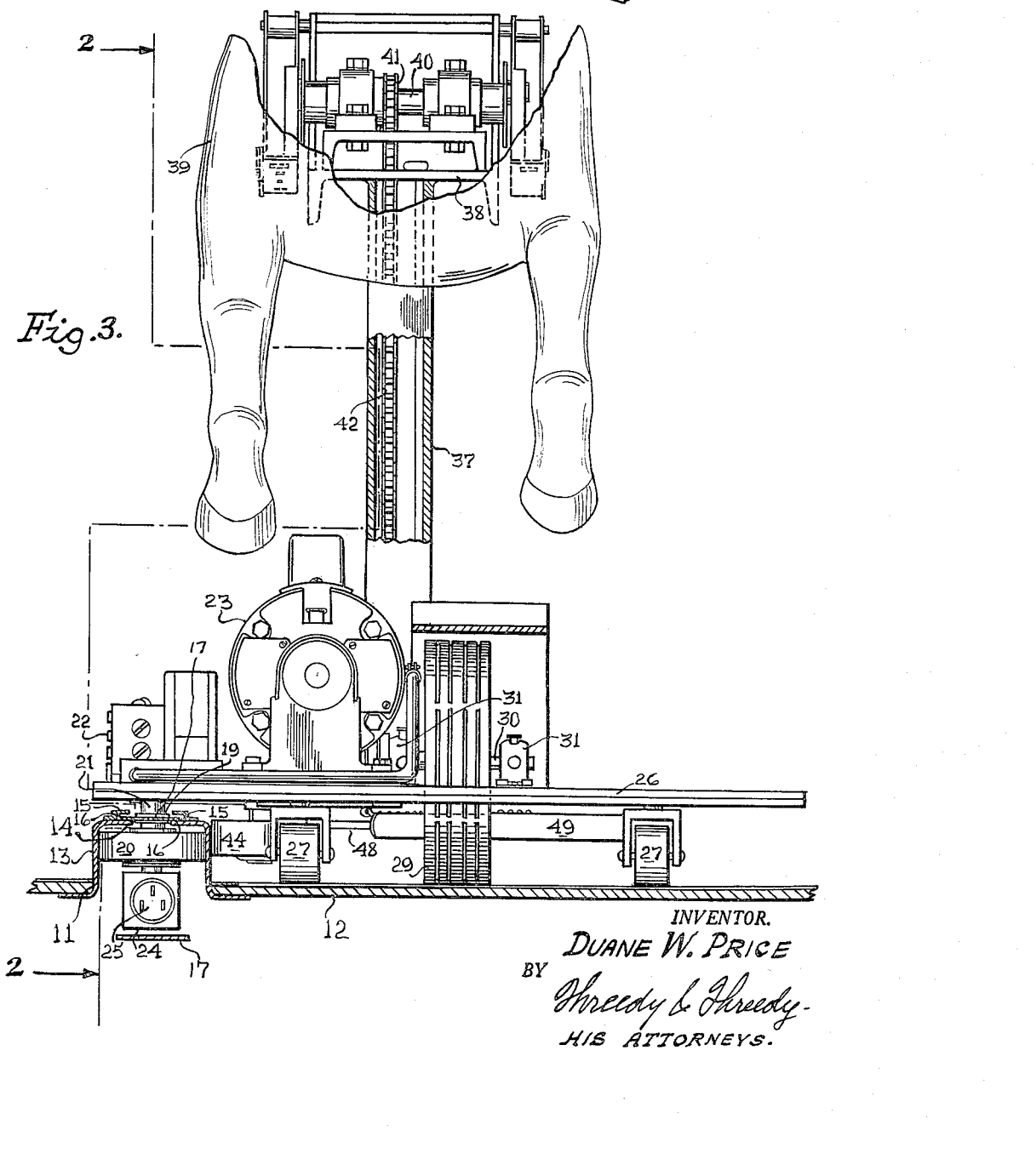
FIG. 3 is a view similar to FIG. 2 but showing the parts thereof in a different position.

The several objects of my invention are preferably accomplished by the form of construction shown in the accompanying drawings.

In this connection I provide an elongated platform 10. This platform 10 may be of any approved construction and may be flush with a horizontal surrounding surface such as a floor or the like or it may be elevated or it may be mounted upon such surface. In the platform 10 is formed an elongated slot 11 extending in the general longitudinal direction of the platform 10. Connected to the floor 12 of the platform is an enclosure or guide member 13 of elongated formation and providing in its top wall with a slot 14 extending in the general longitudinal direction of the enclosure 13 and in parallel relation with respect to the slot 11.

The top wall on opposite sides of the slot 14 is provided with guide channels 15 which receive the longitudinal edges 16 of a flexible belt 17. This belt 17 is of endless construction passing over rollers 18 carried by the platform at opposite ends of the slot 14.

Secured to the belt 17 in any approved manner is a grommet 19 through which projects a shaft 21. The upper end of the shaft 21 carries an electric commutator 22 of any approved construction for carrying an electric circuit to an electric motor 23. A box 24 is carried by the opposite end of the shaft 21. This box 24 carries an electric socket 25 by means of which an electric plug of an electric cable may be connected for conducting current to the motor 23.

On the shaft 21 is mounted a guide roller 20 which engages the opposite side walls of the enclosure 13 to properly track the movement of the belt 17 longitudinally within the enclosure 13.

The shaft 21 is carried by a mounting base 26. This base 26 may be of any approved construction. As will be hereinafter more clearly shown the shaft 21 acts as a pivot for the base 26 in its rotative movements relative to the platform 10.

The base 26 is supported above and in spaced relation with respect to the platform 10 by means of roller bearing brackets 27, there being four of such brackets.

Figure 4:
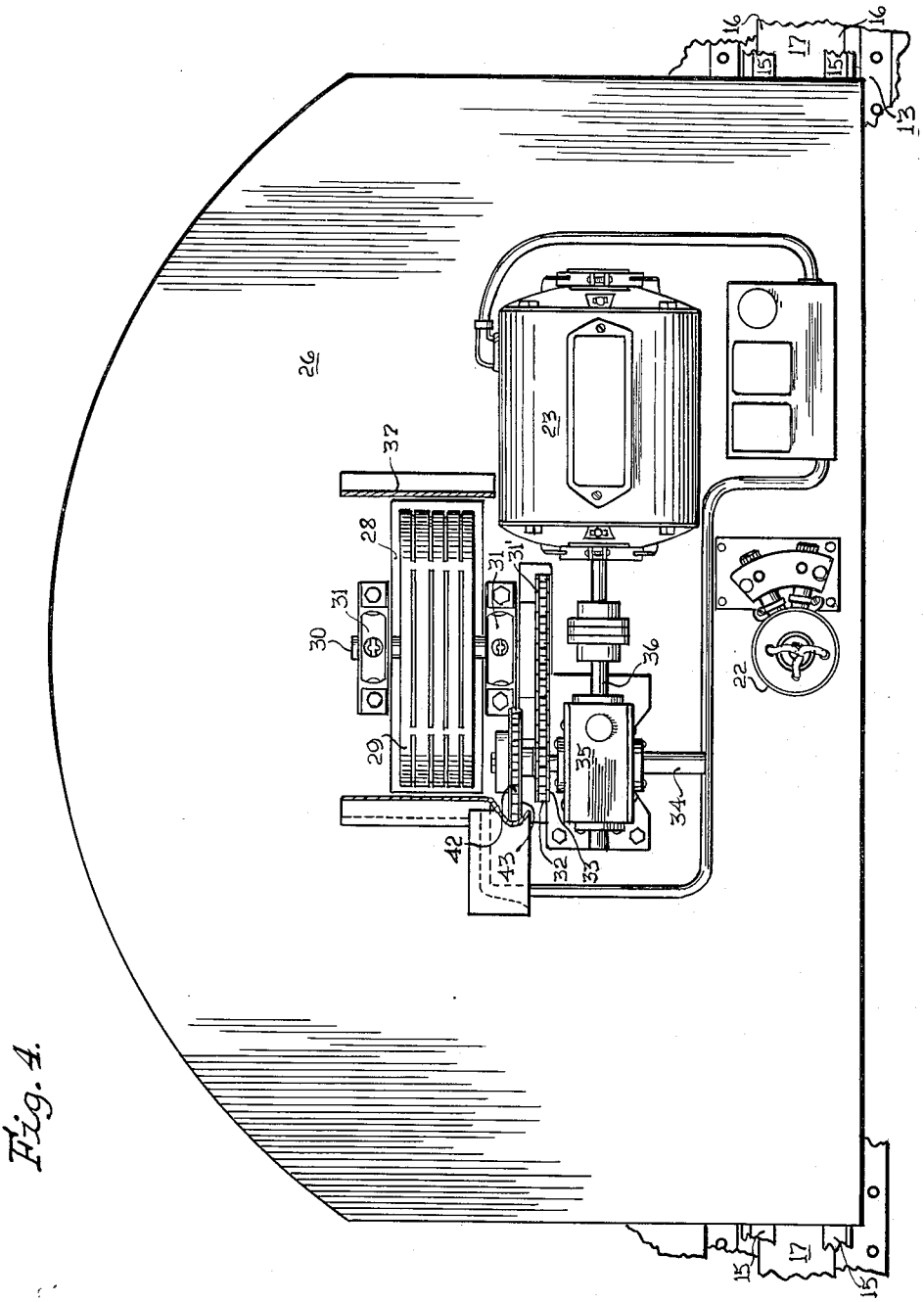
FIG. 4 is a sectional detail view taken substantially on line 4—4 of FIG. 2.

Formed in the base 26 is an opening 28, FIGS. 4 and 5. Projecting through this opening 28 is a traction wheel 29 operatively engaging the floor 12. The traction wheel is mounted on a shaft 30 the ends of which are journalled in bearings 31. One end of the shaft 30 has fixedly secured thereto a sprocket gear 31'. A sprocket chain 32 operatively connects the gear 31' with a sprocket gear 33 mounted on a shaft 34 journalled in a gear box 35. The shaft 36 of the motor 23 is also journalled in the gear box 35. In the gear box 35 is a train of gears which operatively connects the shaft 36 and shaft 34.

Extending upwardly from the base 26 is a pedestal 37, the pedestal 37 being hollow in construction and being fixedly secured in any suitable manner to the base 26.

The upper part of the pedestal 37 carries a chassis structure 38 which supports the body 39 of the hobby horse.

The body 39 is intended to rock relative to the pedestal 37. This may be accomplished in various ways. In the present instance the rocking mechanism includes among other things a shaft 40 having fixed thereto a sprocket gear 41. The sprocket gear 41 by means of a sprocket chain 42 extending through the pedestal 37 is connected to a sprocket gear 43 mounted on the shaft 34, FIG. 4. The mechanism for rocking the body or horse is only schematically shown as it, in itself, constitutes no part of the present invention.

Secured to the bottom side of the base 26 in any suitable manner are guide rollers 44 and 45 which engage the adjacent guide wall 46 of the enclosure 13. The roller 45 is pivoted as at 47 to one end of a piston rod 48 of a piston 49, in turn pivoted as at 50 to the underside of the base 26. A bracket 51 is secured to the base 26 and carries a hook 52 to which is connected one end 53 of a spring 54, the opposite end of the spring being connected to an arm 55 to which the roller 45 is pivoted. The roller 45 when acted upon by the piston 49 and spring 54 has for its function, absorbing the shock which is otherwise transmitted to the belt enclosure when the body reaches the end of its travel and is rotated to a position for return travel.

When the motor 23 is energized rotation is transmitted to the traction wheel 29 with the result that the base 26 with the body 39 mounted thereon is caused to travel along a straight line, the base being guided in such travel by the belt 17 and rollers 44. When the base and the body reach the end of its travel in one direction the traction wheel operating upon the floor 12 will cause the base and body to pivot about the shaft 21 to a position for travel in an opposite direction, and on the opposite side of member 13. In this respect it will be noted that when the base and body thereon reaches either of its opposite ends of travel the shaft 21 serves as a pivot whereby the body will pivot about the shaft 21 under the action of the traction wheel. The rollers 44 which are spaced apart from each other engage the adjacent side wall of the enclosure 13 and serve to hold the base 26 against rotation by action of the traction wheel 29 during the movement of the base longitudinally with respect to the enclosure 13 and until the base has reached a predetermined point in its travel upon the platform where it is caused to rotate about the shaft 21 as shown in FIG. 1 by the traction wheel 29.

When the base and body is caused to pivot about the axis of the shaft 21 under the action of the traction wheel 29, the spring 54 will yieldably hold the roller 45 against the adjacent guide wall 46 of the belt enclosure, and the piston 49 will function to absorb any sudden impact which would otherwise be transmitted to the roller 45.

While I have illustrated the figure carried by the pedestal 37 in the form of a horse it is obvious that such figure may assume any desired character. In fact it may be in the form of a carriage or a buggy, an elephant, dog or the like.

The length of travel of the hobby horse may be such as will meet the requirements of the place where the device is put into operation.

From the foregoing description it will be clear that I have provided an amusement device wherein children of various ages may receive the maximum of amusement. My device is especially useful in places where live animals are not desirable.

It is intended that the various operating parts of the mechanism be covered to the maximum extent so as not to be exposed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An amusement ride comprising a riding surface providing a guide member extending longitudinally thereof, a support for a rider including a base movable over said surface in opposite longitudinal directions and rotatable with respect thereto, means carried by said base in engagement with said guide member providing a pivot about which said base is adapted to rotate, a traction wheel carried by said base and engaging said surface for moving said base in said opposite longitudinal directions with respect thereto and cooperating with said pivot for rotating said base axially about said pivot when said base is at either end of its longitudinal movement with respect to said guide member, roller means carried by said base and engageable with said guide member for limiting the rotation of said base about said pivot and for guiding said base in its movement in said opposite longitudinal directions, and motor means carried by said base for actuating said traction wheel.

2. An amusement ride comprising a riding surface providing a member extending longitudinally thereof, a support for a rider including a pedestal carrying said support and having a base movable over said surface in opposite longitudinal directions and rotatable with respect thereto, means carried by said base in engagement with said member providing a pivot about which said base is adapted to rotate, traction means carried by said base and engaging said surface for moving said base in said opposite longitudinal directions with respect thereto and cooperating with said pivot for rotating said base axially about said pivot when said base is at either end of its longitudinal movement with respect to said member, means carried by said base and engageable with said member for limiting the rotation of said base about said pivot and for guiding said base in its movement in said opposite longitudinal directions, and means for actuating said traction means.

3. An amusement ride comprising a substantially flat elongated platform having means providing an elongated slot extending longitudinally of said platform with the opposite ends of the slot terminating short of the opposite ends of said platform, a pedestal supporting a hobby horse, a base member having rollers engaging said platform, said base member carrying said pedestal and movable upon said platform, said base member having an elongated opening formed therein, a motor-driven traction wheel carried by said base member and extending through the opening of said base member into engagement with the platform for moving said base member longitudinally in opposite directions with respect to said slot of said platform, a pivot member carried by said base member and operating in the slot of said platform and about which said base member is pivoted by said traction wheel when said base member is at either end of the slot in said platform to position said base member for return movement longitudinally with respect to the slot in said platform, and a guide means carried by said base member engageable with said means providing the elongated slot and cooperating with said pivot member for limiting the pivotal movement of said base member about said pivot member and for guiding said base member in its movement in said opposite longitudinal directions.

4. The amusement ride defined by claim 3 wherein said guide means includes roller means carried by said base member in spaced relation with respect to each other and at one side edge portion thereof and engaging an adjacent wall of said slot-providing means to cooperate with said traction wheel to guide said base member in its longitudinal movement with respect to the slot of the platform.

No references cited.